(12) United States Patent
Magistro et al.

(10) Patent No.: US 11,908,469 B2
(45) Date of Patent: Feb. 20, 2024

(54) VOICE CONTROL SYSTEM, CORRESPONDING MOTORCYCLE, HELMET AND METHOD

(71) Applicant: STMicroelectronics S.r.l., Agrate Brianza (IT)

(72) Inventors: Nicola Magistro, Milan (IT); Alessandro Mariani, Monza (IT); Riccardo Parisi, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 254 days.

(21) Appl. No.: 17/144,473

(22) Filed: Jan. 8, 2021

(65) Prior Publication Data

US 2021/0217417 A1 Jul. 15, 2021

(30) Foreign Application Priority Data

Jan. 10, 2020 (IT) .......................... 102020000000319

(51) Int. Cl.
*G10L 15/22* (2006.01)
*A42B 3/30* (2006.01)
(Continued)

(52) U.S. Cl.
CPC ............... *G10L 15/22* (2013.01); *A42B 3/30* (2013.01); *G06F 3/167* (2013.01); *G10L 15/08* (2013.01); *G10L 15/30* (2013.01); *G10L 25/78* (2013.01); *H04R 1/08* (2013.01); *B62J 45/10* (2020.02); *G10L 2015/088* (2013.01); *G10L 2015/223* (2013.01)

(58) Field of Classification Search
USPC .......................... 704/246, 247, 251, 252, 275
See application file for complete search history.

(56) References Cited

U.S. PATENT DOCUMENTS 8,060,149 B1 * 11/2011 Louis ..................... H04M 1/05
381/384
2002/0160723 A1 10/2002 Yagi
(Continued)

FOREIGN PATENT DOCUMENTS

GB 2553683 3/2018

*Primary Examiner* — Leonard Saint-Cyr
(74) *Attorney, Agent, or Firm* — Slater Matsil, LLP (57) ABSTRACT

An embodiment dashboard voice control system for a motorcycle comprises receiver circuitry to receive voice-generated signals, command recognition circuitry to recognize voice-generated command signals for a motorcycle dashboard out of the voice-generated signals received at the receiver circuitry as well as command implementation circuitry to implement motorcycle dashboard actions as a function of voice-generated command signals recognized by the command recognition circuitry. The command recognition circuitry comprises a local command recognition circuit configured to recognize and supply to the command implementation circuitry voice-generated command signals recognized locally, and a network connectivity interface configured to transmit voice-generated signals to a net-based voice-generated command signal recognition facility and to receive from the net-based recognition facility in order to supply to the command implementation circuitry voice-generated command signals recognized by the net-based signal recognition facility.

20 Claims, 8 Drawing Sheets

(51) Int. Cl.
*G06F 3/16* (2006.01)
*G10L 15/08* (2006.01)
*G10L 15/30* (2013.01)
*G10L 25/78* (2013.01)
*H04R 1/08* (2006.01)
*B62J 45/10* (2020.01)

(56) References Cited

U.S. PATENT DOCUMENTS

| | | |
|---|---|---|
| 2010/0138145 A1* | 6/2010 | Choi ................. G01C 21/3629 |
| | | 701/533 |
| 2014/0273863 A1 | 9/2014 | Luizzi |
| 2015/0269939 A1 | 9/2015 | Gruchalski et al. |
| 2015/0350774 A1 | 12/2015 | Furst et al. |
| 2016/0091188 A1* | 3/2016 | Milligan ................ H05B 47/00 |
| | | 362/105 |
| 2016/0111090 A1 | 4/2016 | Holdren et al. |
| 2019/0147873 A1 | 5/2019 | Voigt |
| 2019/0279620 A1 | 9/2019 | Talwar et al. |
| 2019/0320978 A1* | 10/2019 | Lee ........................ A61B 5/375 |
| 2021/0065712 A1* | 3/2021 | Holm ..................... G06V 40/20 |

* cited by examiner

VOICE CONTROL SYSTEM, CORRESPONDING MOTORCYCLE, HELMET AND METHOD

CROSS-REFERENCE TO RELATED APPLICATIONS

This application claims the benefit of Italian Application No. 102020000000319, filed on Jan. 10, 2020, which application is hereby incorporated herein by reference.

TECHNICAL FIELD

The description relates to voice control systems and methods, and, in particular embodiments, to motorcycle voice control systems and methods.

BACKGROUND

An approach still largely prevailing in the motorcycle (motorbike) market contemplates manual control of the motorcycle dashboard: that is, the motorcycle rider uses one of his or her hands to control the dashboard, which almost inevitably involves temporarily releasing or at least changing handlebar grip.

While attractive and desirable, implementing a voice recognition system for motorcycle dashboard control raises various issues and aspects to be addressed, such as:
- a high noise level likely to enter a microphone during operation,
- high CPU load (which suggests using powerful SoCs),
- possible reduced battery duration for the hands-free kit expected to equip the motorcyclist's helmet, and
- reduced access (or no access at all) to advanced services as possibly related to lack of network connectivity in some areas, with no fall back solution in case of lack of connectivity.

SUMMARY

An object of one or more embodiments is to contribute in addressing such issues thus facilitating implementing a reliable voice recognition system for motorcycle dashboard control.

According to one or more embodiments, that object can be achieved by means of a system having the features set forth in the claims that follow.

One or more embodiments may relate to a corresponding motorcycle.

One or more embodiments may relate to a corresponding helmet for a motorcyclist (motorbiker).

One or more embodiments may relate to a corresponding method.

The claims are an integral part of the technical teaching provided in respect of the embodiments exemplified herein.

One or more embodiments provide a HW/SW-based solution which may comprise a "smart" helmet in combination with a control unit on-board a motorcycle (an instrument cluster, for instance) able to provide voice commands regardless of a network connection status, with the capability of using both a local voice recognition engine and a cloud-based voice recognition engine, which may result in a cost-effective system.

One or more embodiments may provide a hybrid solution which facilitates operating such a control unit both in the presence and in the absence of network availability.

In one or more embodiments, system operation can be triggered as a result of a voice command detected by means of a simple voice detection procedure, which may reduce CPU load and, as a consequence, battery consumption on the smart helmet side.

One or more embodiments may rely on voice commands in order to render dashboard control easier (and more user-friendly) while reducing CPU usage, which may result in an increased battery duration in a smart helmet.

In one or more embodiments, a reduced CPU load may be involved in waking up and triggering the system thanks to a first filtering action aimed at detecting the presence of voice over noise.

This may occur, for instance, by running a voice detection procedure involving about 2MIPS on a microcontroller or microprocessor device as discussed in the following.

While primarily advantageous for helmet-mounted arrangements, this may benefit also control units (an instrument cluster, for instance) installed on board a motorcycle.

One or more embodiments can be effectively applied both to low-cost and to high-end digital instrument control systems (instrument clusters, for instance) for the motorcycle market.

One or more embodiments may facilitate access to cloud-based services in the presence of network availability, while also possibly facilitating multi-user interaction.

One or more embodiments may provide a control system where a control unit (an instrument cluster, for instance) on-board of a motorcycle (as discussed in the following, this designation is intended to apply also to similar two- or three-wheeled vehicles such as scooters or mopeds, for instance) can receive voice commands from a user. As exemplified herein, the system can comprise a processor (a microcontroller, for instance) which communicates via one or more wireless communication modules (Bluetooth, for instance) with a headset (also equipped with a wireless communication module) mounted on a user's helmet. The processor also communicates via a wireless module (a smart phone, for instance) with a network such as the Internet in order to perform functions that involve cloud services.

Optionally, the system can also co-operate with a motorcycle-mounted microphone (this may be operable only when the motorbike is not driving/running, for instance).

In one or more embodiments, voice detection via a processor (a microcontroller/microprocessor, for instance) mounted on a motorcyclist's helmet can activate wireless transmission (only) when voice activity is detected.

In one or more embodiments, such a helmet-mounted processor may perform a recognition procedure of one or more "wake words" with transmission to a motorcycle-mounted processor taking place (only) as a result a positive outcome of such recognition procedure.

One or more embodiments may thus be based on the recognition that such voice activity and/or wake word processing at the helmet may avoid unnecessary transmission activity, thus being beneficial in terms of energy saving and longer useful life of helmet battery resources.

In one or more embodiments, voice command recognition (interpretation) can take place via a "local" procedure implemented in a motorcycle-mounted processor and/or via network (Cloud, for instance) resources, with the possibility for command interpretation to take place locally in the absence of network availability.

In one or more embodiments, in the presence of network resources available, recognition can be performed in both ways (locally and via cloud, for instance) with the first (earlier) recognition result available used for control purposes.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the following description, various specific details are given to provide a thorough understanding of various exemplary embodiments of the present specification. The embodiments may be practiced without one or several specific details, or with other methods, components, materials, etc. In other instances, well-known structures, materials, or operations are not shown or described in detail in order to avoid obscuring various aspects of the embodiments. Reference throughout this specification to "one embodiment" or "an embodiment" means that a particular feature, structure, or characteristic described in connection with the embodiment is included in at least one embodiment. Thus, the possible appearances of the phrases "in one embodiment" or "in an embodiment" in various places throughout this specification are not necessarily all referring to the same embodiment. Furthermore, particular features, structures, or characteristics may be combined in any suitable manner in one or more embodiments.

The headings/references provided herein are for convenience only, and therefore do not interpret the extent of protection or scope of the embodiments.

One or more embodiments may be applied, for instance, to motorcycle voice control systems.

As used herein, the designation "motorcycle" will apply to self-propelled two-wheeled or three-wheeled motor vehicles adapted to be ridden by a driver (motorcyclist, usually wearing a helmet) irrespective of the great range of variations possible in motorcycle design to suit a range of different purposes.

As used herein, the designation motorcycle will thus apply irrespective of whether a certain vehicle may qualify as such in the light of legislation/regulations currently applicable in a certain country or jurisdiction. A scooter or a moped may be exemplary of a vehicle falling under the designation of motorcycle as used herein.

Figure 1:
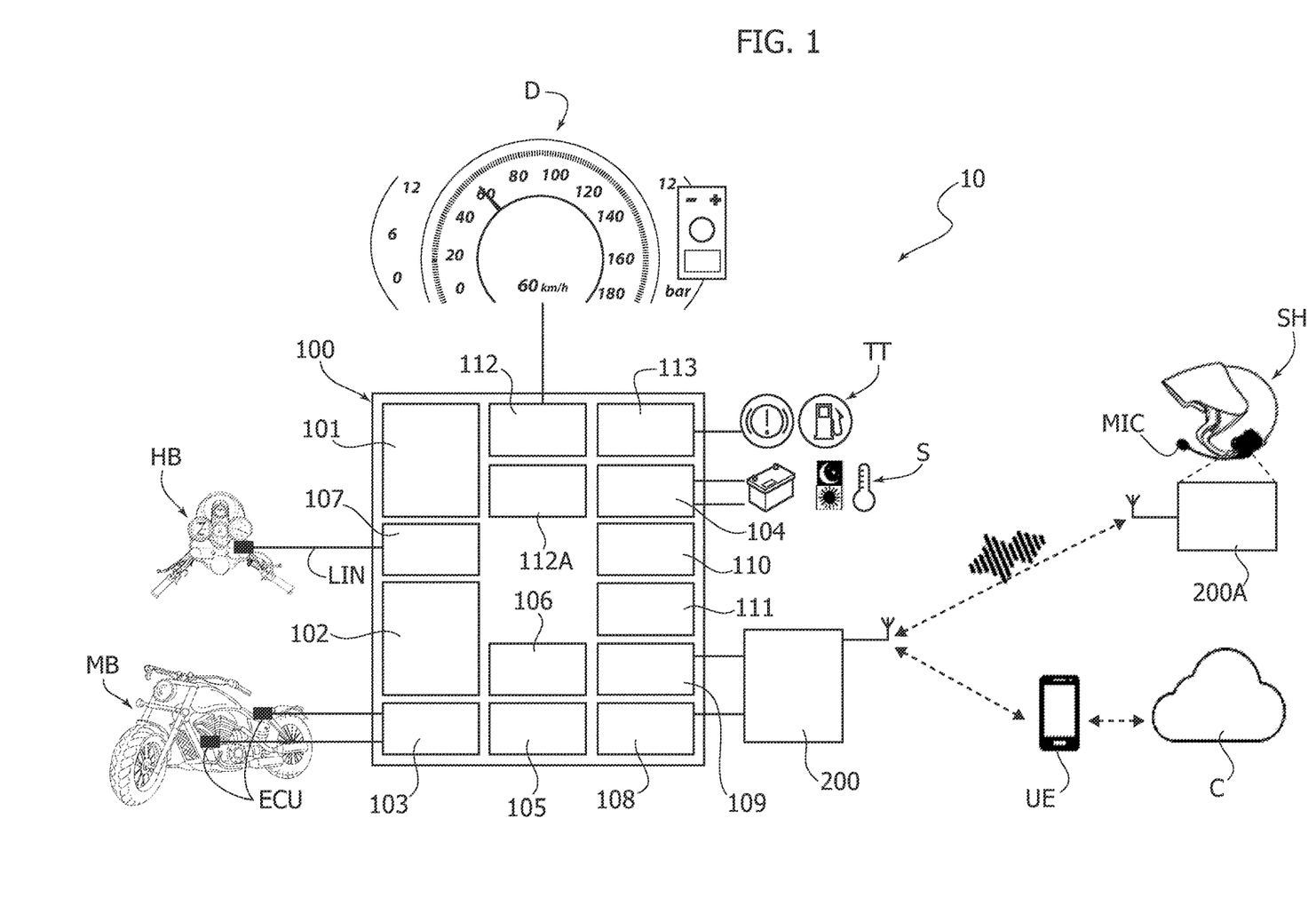
FIG. 1 is a general functional diagram of a system according to embodiments as per the instant description.

FIG. 1 is a general exemplary view of a (hybrid) motorcycle voice control system 10 according to embodiments as exemplified herein.

As exemplified in FIG. 1, the system 10 comprises processing circuitry 100 suited and configured (in a manner known to those skilled in the art) to be mounted on-board a motorcycle (motorbike) MB with the capability of communicating with:

at least one "smart" helmet SH worn by a motorcyclist riding the motorcycle MB: this may be via a wireless module 200 (Bluetooth—BT, for instance) with a corresponding module 200A equipping the helmet SH; as discussed in the following, possible communication with another smart helmet SH2 worn by another motorcyclist (with possible "tailoring" of voice control to another user profile for the motorcycle MB) or even a passenger of the motorcycle MB may be contemplated in one or more embodiments;

a mobile communication equipment UE supporting data communication and providing access to network resources such as Internet resources, for instance (cloud data storage and computing as discussed in the following are exemplary of such resources); in one or more embodiments, network connection may be achieved using a smart phone (a smart phone worn by the motorcyclist may be exemplary of such equipment as exemplified by UE in FIG. 1) as a bridge in cooperation with a wireless module, such as the BT module 200 or a WiFi facility.

In one or more embodiments, operation of a system 100 as exemplified herein can be adequately supported by processing circuitry 100 such as devices of the Accordo™ family of devices commercially available with companies of the STMicroelectronics group (see st.com).

It will be otherwise appreciated that, throughout this description, reference to Accordo™ devices is merely for exemplary purposes: in fact, one or more embodiments lend themselves to being implemented on any of a wide variety of microcontroller (MCU)/microprocessor (MPU) platforms currently available on the market.

Consequently, while beneficial in understanding the embodiments, repeated reference to Accordo™ devices is not to be construed, even indirectly, in a limiting sense of the embodiments.

Accordo™ devices are a family of devices that provide a cost effective microprocessor solution for modern automotive radio systems including a MIPS efficient Dual Core 32-bit ARM including Cortex-R4 (101 in FIG. 1) as well as Cortex-M3 (102 in FIG. 1) processor capabilities, with the ARM Cortex-M3 controller 102 dedicated to real-time CAN-based (103 in FIG. 1) vehicle interface processing capable of interfacing with electronic control units (ECUs) in a vehicle such as the motorcycle or motorcycle MB hosting the device 100.

Embedded SRAM, audio ADCs and DACs (see 104 and 105 in FIG. 1, with the capability of supporting operation of sensors S such as temperature, light or battery charge sensors, for instance), isolated CAN MCU for car radio and display audio applications and an embedded powerful digital sound processing (DSP—106 in FIG. 1) subsystem are further advantageous features of the Accordo™ family of devices.

As exemplified in FIG. 1, these devices also include an exhaustive set of common interfaces such as, for instance:

UART 107 and 108, capable of supporting line communication over a line LIN with handlebar button and joysticks at the handlebar HB of the motorcycle MB,

I2S, 109,

USB, 110 a video input interface in, a CLCD/TSC display interface 112, configured, for instance via an associated 2-2.5D memory arrangement 112A, to co-operate with a dashboard display unit D of the motorcycle MB, a GPIO (general purpose input/output) interface 113 capable of supporting, for instance, LED telltales TT (brake on, low fuel level) equipping the motorcycle MB.

This facilitates implementing a feature-rich system as well as a cost-effective solution, supported by a complete software package, which allows a very fast system implementation.

Accordo™ family devices are thus exemplary of devices suited to manage the entire audio chain from analog or digital inputs to analog or digital outputs, including digital audio media decoding, sample rate conversion among various sources, intelligent routing and audio effects/DSP post processing, with the capability of supporting both low-cost systems based on real time OS, scaling up to demanding applications based on Linux OS.

To sum up, Accordo™ devices (such as, for instance, a combination of two devices, Accordo2 and Accordo5) may feature display/graphical capabilities as well as media and vehicle connectivity and audio features which facilitate their use in digital instrument applications for motorcycles (including various types of 2- and 3-wheelers as discussed previously).

This may be due to features such as:

capability of managing visual human-machine interfaces (HMIs);

connectivity with mobile devices available;

vehicle interfaces suited for interfacing with a vehicle such as a motorcycle;

availability of (three) integrated DSPs, originally devised for sound effects and erasure coding (EC) plus noise reduction (NR) acceleration;

capability of receiving vocal input from a legacy helmet equipped for Bluetooth communication (as already available in the market) and, compatible with low-noise conditions being met, from a local microphone embedded in the motorcycle (such microphones are already currently used for safety purposes, for instance to facilitate emergency calls).

FIGS. 2 to 5 are block diagrams exemplary of various possible embodiments of a system 10 as discussed in connection with FIG. 1 where processing/operating functions are allotted to the unit 100 (an Accordo™ device, by way of example) in different manners.

In fact, certain processing/operating functions allotted to the unit 100 in certain embodiments may, in other embodiments, be allotted to other elements, such as one or more (FIG. 4) smart helmets SH, SH2 intended to be worn by one or more motorcyclists riding a same motorcycle such as MB at different times with possible different use (control) profiles.

Figure 2:
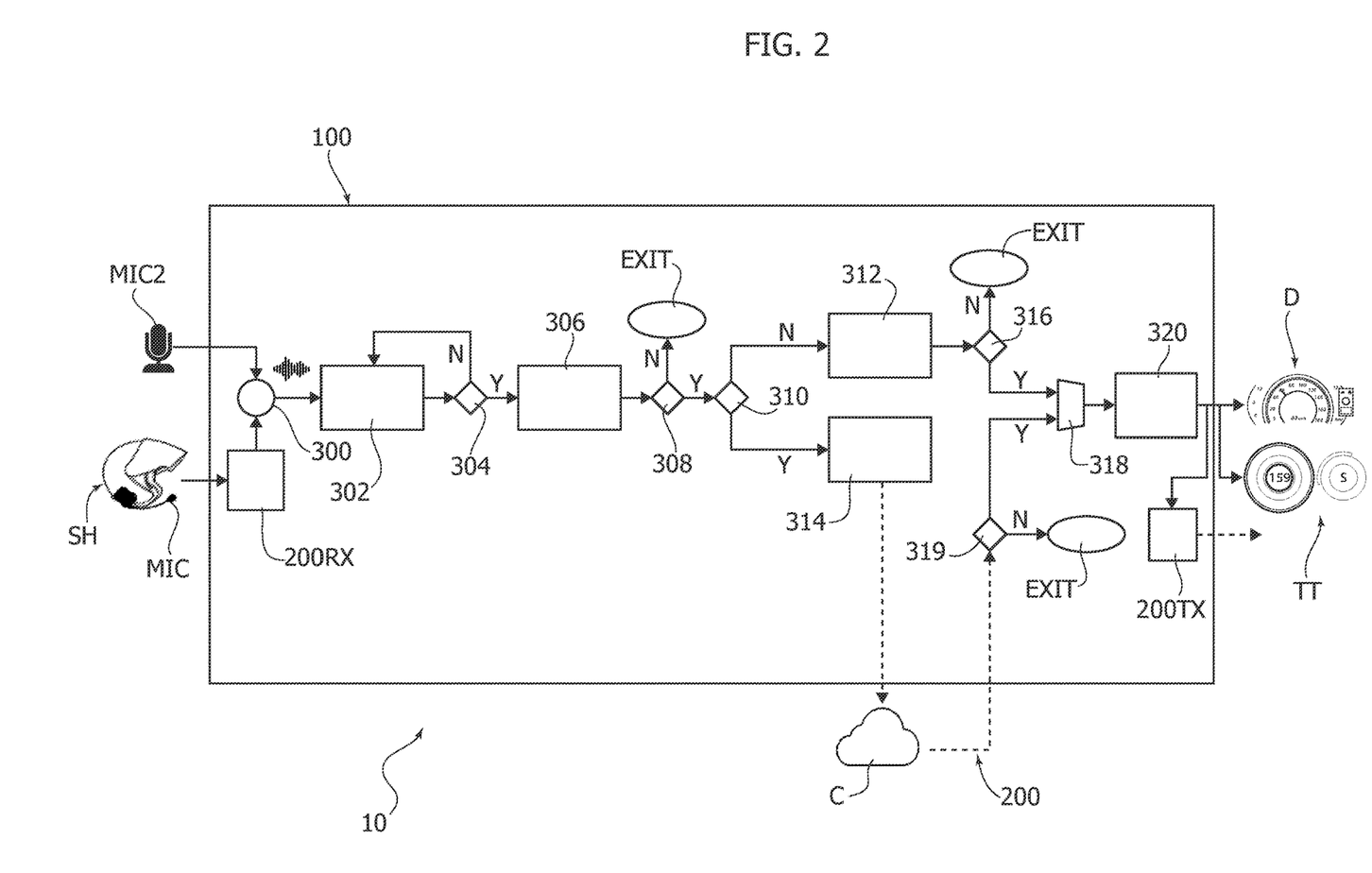
FIG. 2 is a block diagram exemplary of possible embodiments as per the instant description.

FIG. 2 is exemplary of embodiments where processing/ operating functions of a system 10 as discussed in connection with FIG. 1 are almost entirely allotted to a unit 100 (suited to be implemented with an Accordo™ device as discussed previously) with the unit 100 mounted—in a manner known to those of skilled in the art—on board the motorcycle MB illustrated in FIG. 1 (not visible in FIGS. 2 to 5).

Embodiments as exemplified in FIG. 2 are exemplary of systems 10 configured to operate in a "legacy" scenario in conjunction with a "smart" motorcyclist helmet SH equipped with microphone MIC and/or with a motorcycle-mounted microphone MIC2 (this may be operable only when the motorbike is not driving/running, for instance), with the microphones MIC in the smart helmet SH and/or the microphone MIC2 capable of collecting a vocal message, as uttered by a motorcyclist, for instance.

As discussed, such helmets SH equipped with a microphone MIC and/or microphones MIC2 are already currently used, for safety purposes, for instance. As such, they can be regarded as "legacy" equipment of a motorcycle MB, possibly a motorcycle MB intended to be retrofitted with a unit 100 as discussed herein in order to provide a voice control system according to embodiments.

In embodiments as exemplified in FIG. 2, the unit 100 may be equipped with a receiver module 200RX (Bluetooth, for instance—see 108, 109 in FIG. 1) to receive vocal messages from a homologous transmitter module 200A in the microphone-equipped smart helmet SH and/or from the microphone MIC2. As noted, such helmets SH with an associated microphone MIC and transmitter/receiver modules (Bluetooth, for instance) are already currently used, which makes it unnecessary to provide a more detailed description herein.

Whichever the source—microphone-equipped smart helmet SH or microphone MIC2—in one or more embodiments, a vocal message as uttered by a motorcyclist can be made available as an audio stream at a (mixing) node to be supplied to a voice activity detection module 302.

There, the audio stream can be analyzed by a voice activity detection procedure thus facilitating a check (as exemplified by block 304) as to whether a voice signal has been detected or not. In this latter case (negative outcome, N, from 304) the system re-cycles onto the voice activity detection module 302.

In one or more embodiments, the voice activity detection procedure—which can be of any type known to those of skill in the art—can provide power-optimized operation reducing CPU usage.

Block 306 (to which the system evolves as a result of a positive outcome, Y, at 304) is exemplary of possible use of a wake word engine—again of a known type—for detecting a keyword (e.g.: "Alexa", "Siri", "OK Google") to start voice command processing.

Wake word processing at 306 facilitates a check (as exemplified by block 308) as to whether a wake word has been detected or not. In this latter case (negative outcome, N, from 306) the system evolves to an EXIT state.

Block 310 (to which the system evolves as a result of a positive outcome, Y, at 308) is exemplary of a check made as to whether a network connection (Internet, for instance) is currently available: this may be via the Bluetooth 200 and the equipment UE (smart phone, hot spot, and so on, for instance).

As a result of the outcome of the check as to network availability performed at 310, a request is sent:

in the case of a negative outcome, N, at 310 (no network available) to a local voice recognition engine (a command interpreter, for instance) 312; and in the case of a positive outcome, Y, at 310 (network available) to a network-based voice recognition engine (a Cloud command builder, for instance) 314.

In the former case (local engine) a check is performed at 316 as to whether a command is recognized.

A negative outcome, N, at 316 will lead the system towards an EXIT state.

Conversely, a positive outcome, Y, at 316 will result in a corresponding action being (immediately) put in place. This may be via a convergence node 318 leading to activation of a control module 320 (any of 112 and 113 in FIG. 1, for instance), this resulting in certain functions as desired activated at the display D or at any of the LED telltales TT, possibly via a transmitter module 200TX (such as a Bluetooth transmitter module, for instance).

Functions such as change page, show range, show battery charge level, audio to helmet activated, just to mention a few, are exemplary of such possible actions activated.

In the latter case considered at 310 (network connection available) an audio command can be encoded at a Cloud command builder 314 and sent using the network connection exemplified in FIG. 1 (BT module 200, smart phone, hotspot, for instance) towards net-based command recognition resources such as a Cloud-based command recognition engine.

Command recognition can thus be performed at Cloud level as indicated by C, which may entail a more sophisticated recognition/taxonomy capability in comparison with a local engine such as 312.

Compared to a cloud-based engine, a local engine such as 312 can address (only) a subset of commands such as, for instance:
- cluster page management (move to diagnostic page, move to navigation page, move to rearview camera page, . . . ),
- activation of infotainment features (phone call, vocal speech of received SMS or IM, . . . ).

By way of contrast, a cloud-based engine as adapted to be reached via 314 and 200 can manage, in addition to those commands which can be managed by a local engine, additional commands such as, for instance:
- retrieve information (traffic, weather, news, . . . ),
- control of external entities,
- connected gate management,
- smart home and other devices.

A response received from the network (Cloud C, for instance, which may again be via the BT module 200, smart phone, hotspot, . . . as exemplified in FIG. 1) is checked at 319 in respect of whether a command has been recognized at the cloud level C.

A negative outcome, N, at 319 will again lead the system towards an EXIT state.

Conversely, a positive outcome, Y, at 319 will result in a corresponding action being (immediately) put in place.

This may be again via the convergence processing node 318, the control module 320, and the transmitter module 200TX as discussed above, for instance, with the proviso that more powerful command recognition at the network (Cloud) level may result in a broader and more sophisticated range of actions being adapted to be voice-controlled.

Figure 3:
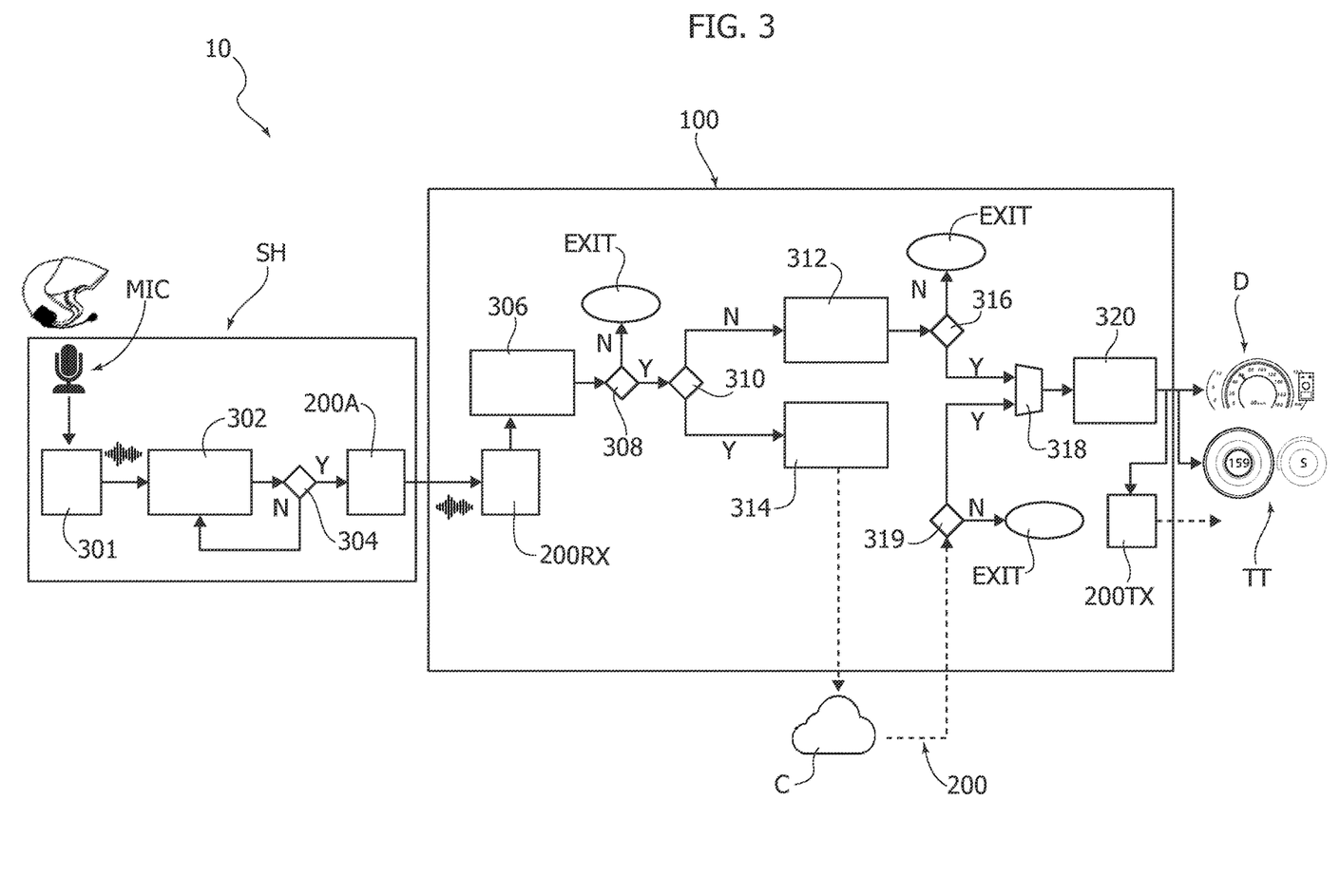
FIG. 3 is another block diagram exemplary of possible embodiments as per the instant description.
Figure 4:
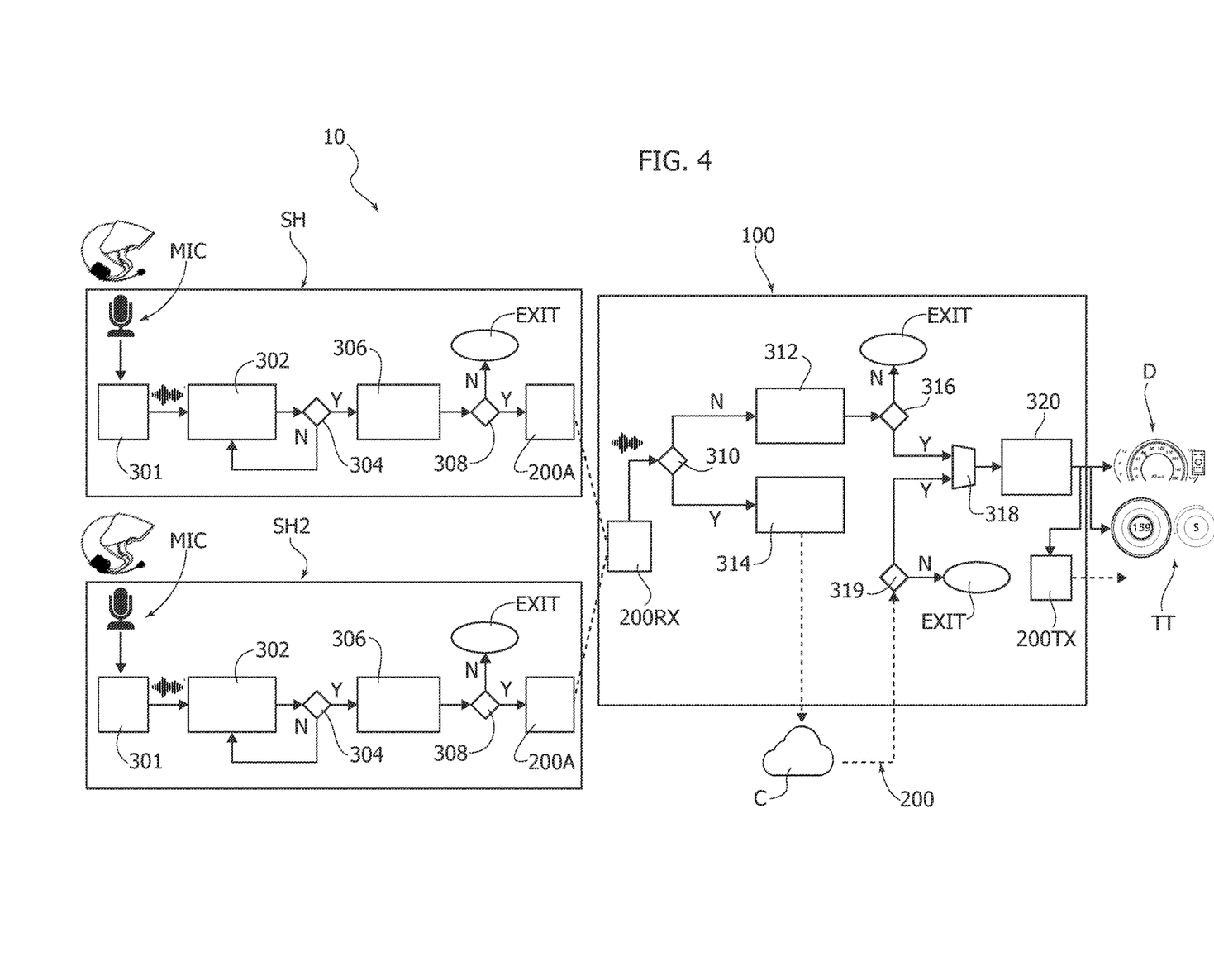
FIG. 4 is still another block diagram exemplary of possible embodiments as per the instant description.

FIGS. 3 and 4 are exemplary of embodiments where certain processing/operating functions allotted to the unit 100 in embodiments as exemplified in FIG. 2 may be "moved" to other elements such as one or more smart helmets SH, SH2.

For that reason, in FIGS. 3 and 4 (and FIG. 5 as well) parts, elements or functions like parts, elements or functions already described in connection with FIGS. 1 and 2 will be indicated with like references symbols, and a description of these parts, elements or functions will not be repeated for brevity.

FIG. 3 is exemplary of embodiments where, thanks to increased processing capability made available—in a manner known to those of skill in the art—at a smart helmet such as SH, voice activity detection processing (involving about 2MIPS, for instance) is performed at the helmet SH as exemplified again at 302 and 304 on voice signal digitized at helmet level via an ADC converter 301 providing conversion to digital of voice signals provided by a helmet-mounted microphone MIC (the presence of a single, helmet-mounted, microphone is assumed for simplicity in FIGS. 3 and 4, where a possible motorcycle-mounted microphone MIC2 is not visible).

Such an approach may prove advantageous in reducing helmet battery consumption insofar as unnecessary continuous signal streaming (BT, for instance) from the helmet transmitter 200A to the receiver 200RX in the unit 100 is avoided: in fact only audio detected as voice (outcome of 304=Y) may be streamed from the transmitter 200A to the receiver 200RX.

In embodiments as exemplified in FIG. 3, the first processing performed in the unit 100 (motorcycle side) is thus the wake word engine 306, with subsequent processing and activity taking place as discussed previously in conjunction with FIG. 2.

FIG. 4 is exemplary of further developments of embodiments in two directions:
- multi-user operation, that is helmet-controlled operation possibly extended to two or more smart helmets SH, SH2 (only two are exemplified here for simplicity) which, for instance, may be helmets intended to be worn by different motorcyclists riding a same motorcycle such as MB at different times with possible different use (control) profiles,
- further expanding the range/complexity of processing performed at the smart helmet level.

It will be otherwise appreciated that developments along two directions as exemplified in FIG. 4 can be pursued independently.

That is, in one or more embodiments:
- multi-user operation as exemplified in FIG. 4 can be applied to system layouts as exemplified in FIGS. 2 and 3,
- similarly, further expansion of the range/complexity of processing performed at the smart helmet level over the system layouts exemplified in FIGS. 2 and 3 can be pursued as exemplified in FIG. 4 without providing for multi-user operation.

In this latter respect (that is, irrespective of whether multi-user operation is contemplated or not), in one or more embodiments as exemplified in FIG. 4, in addition to voice detection processing 302, 304 also wake word processing at 306, 308 is run at the helmet SH and/or SH. This may further reduce battery consumption at the helmet insofar as communication activity (Bluetooth, for instance) between 200A and 200RX is limited to voice messages recognized as containing certain wake words.

This scenario may facilitate implementing multi-user activity insofar as audio streams from different helmets such as SH and SH2 can be selected in a mutual exclusive way, for instance by contemplating different wake words for different users (multi-user with different wake word).

In embodiments as exemplified in FIG. 4, the first processing performed in the unit 100 (motorcycle side) is thus the check as to network availability performed at 310, with subsequent processing and activity taking place as discussed previously in conjunction with FIG. 2.

Figure 5:
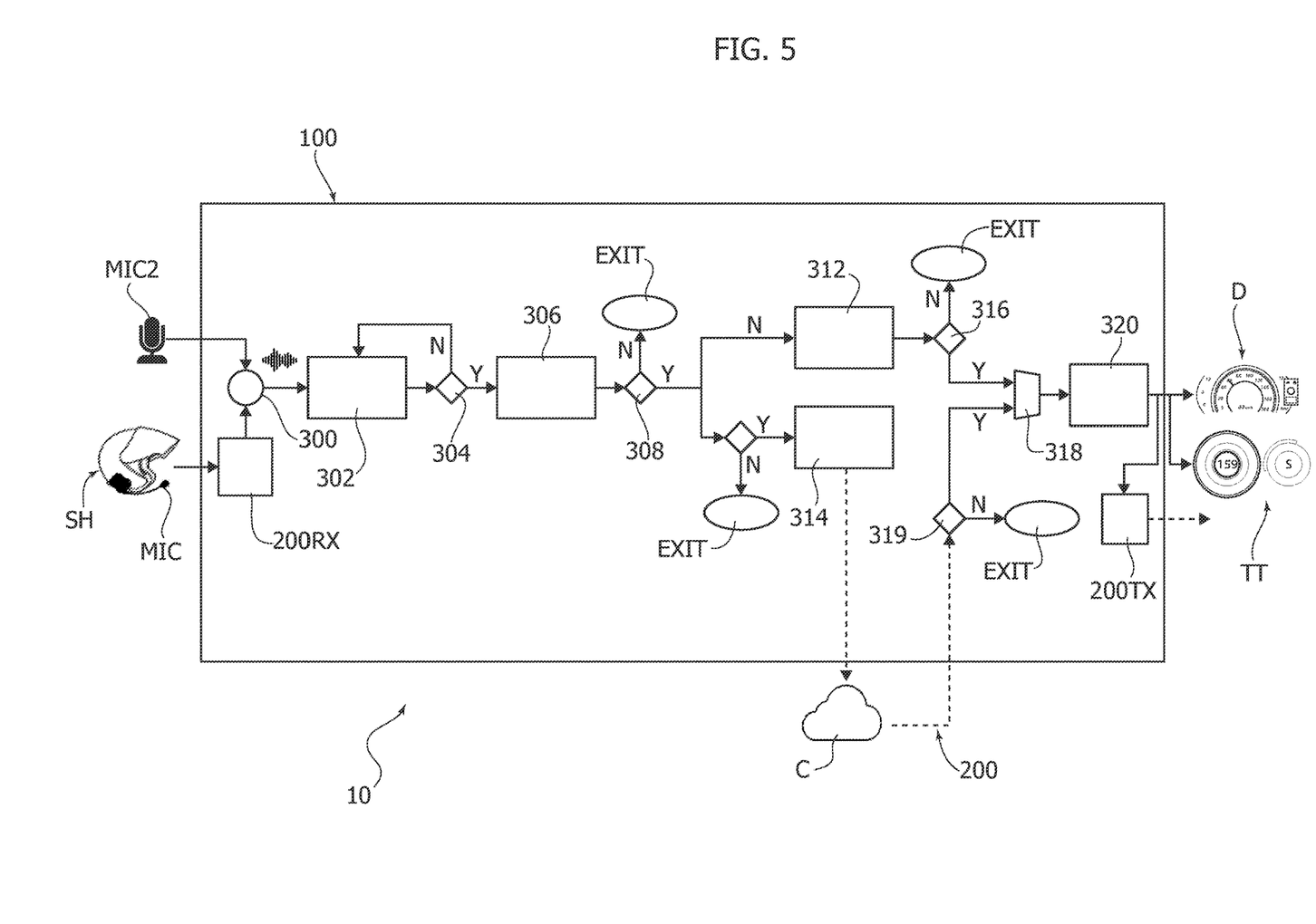
FIG. 5 is a block diagram exemplary of a possible variant which can be applied to embodiments as per the instant description.

FIG. 5 is exemplary of an implementation which may facilitate obtaining a faster response to voice commands.

While exemplified in connection with a system layout as exemplified in FIG. 2, the implementation of FIG. 5 can be applied also to layouts as exemplified in FIGS. 3 and 4 (with or without a multi-user option implemented).

Again, in FIG. 5 parts, elements or functions like parts, elements or functions already described in connection with the previous figures are indicated with like references symbols, without repeating a detailed description of these pails, elements or functions.

Briefly, in embodiments as exemplified in FIG. 5, activation of local voice processing at 312 and 316 is no longer made dependent on the outcome of the test on network availability as performed at 310.

In embodiments as exemplified in FIG. 5, commands are forwarded for processing in parallel towards both paths, namely a local engine at 312 and 316 and a cloud-based engine C via 314.

In embodiments as exemplified in FIG. 5, (only) processing over this latter path (cloud command builder processing at 314, for instance) may be made conditional on the test on network availability as performed at 310, with the system going to EXIT, with no processing performed at 314 and no transmission to a non-available network attempted.

Operation of embodiments as exemplified in FIG. 5 may be based on the criteria of selecting (at the node 318, for instance) in view of subsequent processing and activity the earlier recognition response received, that is, the recognition response received first. This may be either from the local engine at 312 and 316 or from a cloud-based engine via 314, C with a possible subsequent response received from the other engine discarded.

Such an approach may facilitate obtaining a faster response to voice commands.

For instance, in the presence of a command (rapidly) recognized by the local engine 312, a corresponding action may be executed immediately, without waiting (also) for possible cloud-based recognition of the same command.

In the absence of command recognition by the local engine 312, a more sophisticated cloud-based recognition facility may be relied upon (if available).

Figure 6:
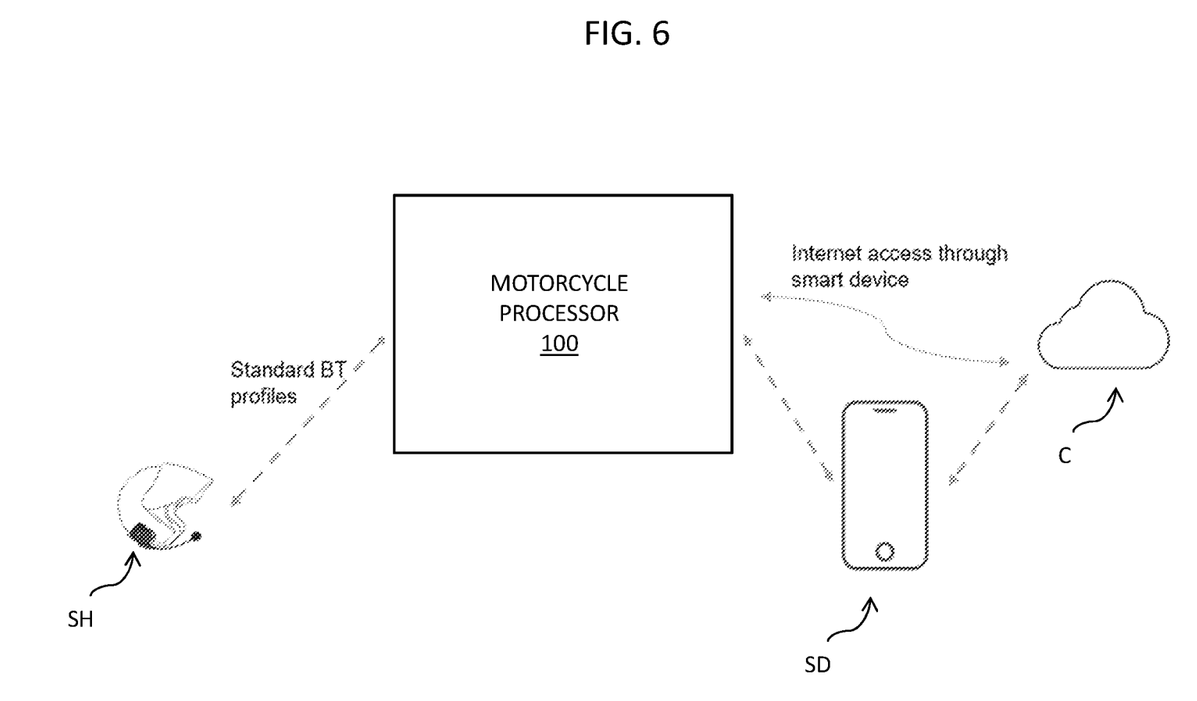
FIGS. 6-8 are block diagrams illustrating a motorcycle processor acting as a bridge to connect a smart device in parallel with the motorcycle helmet.
Figure 7:
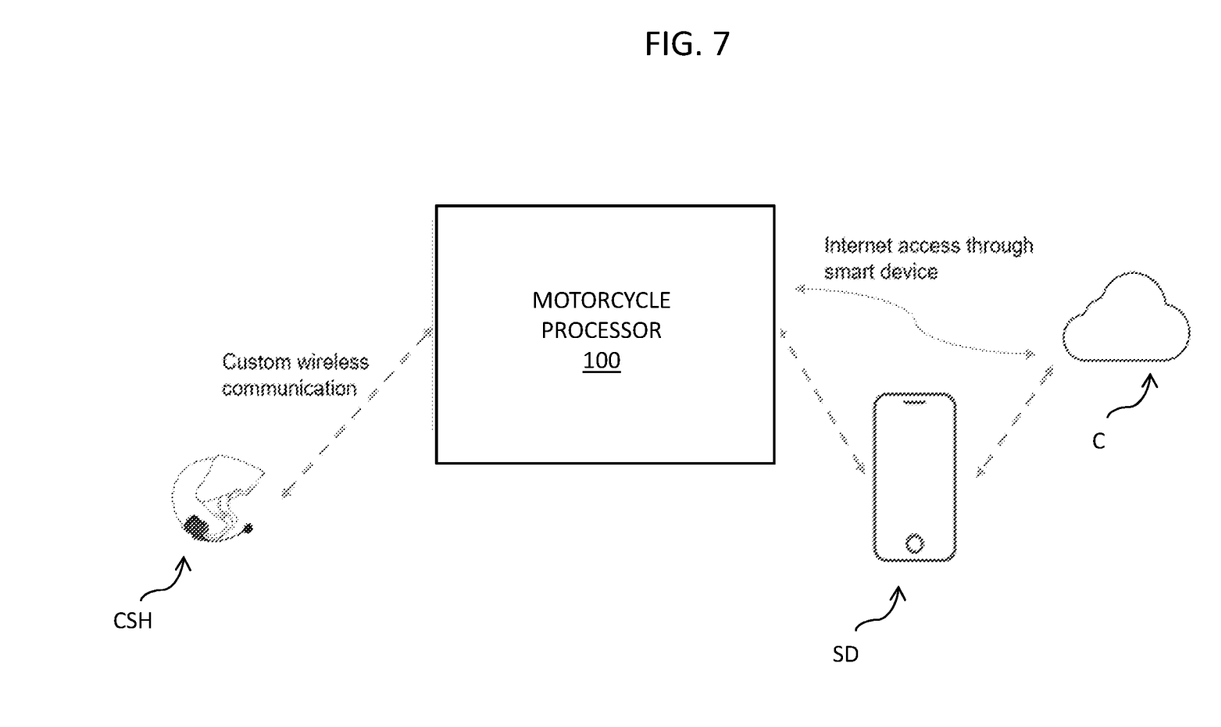
Figure 8:
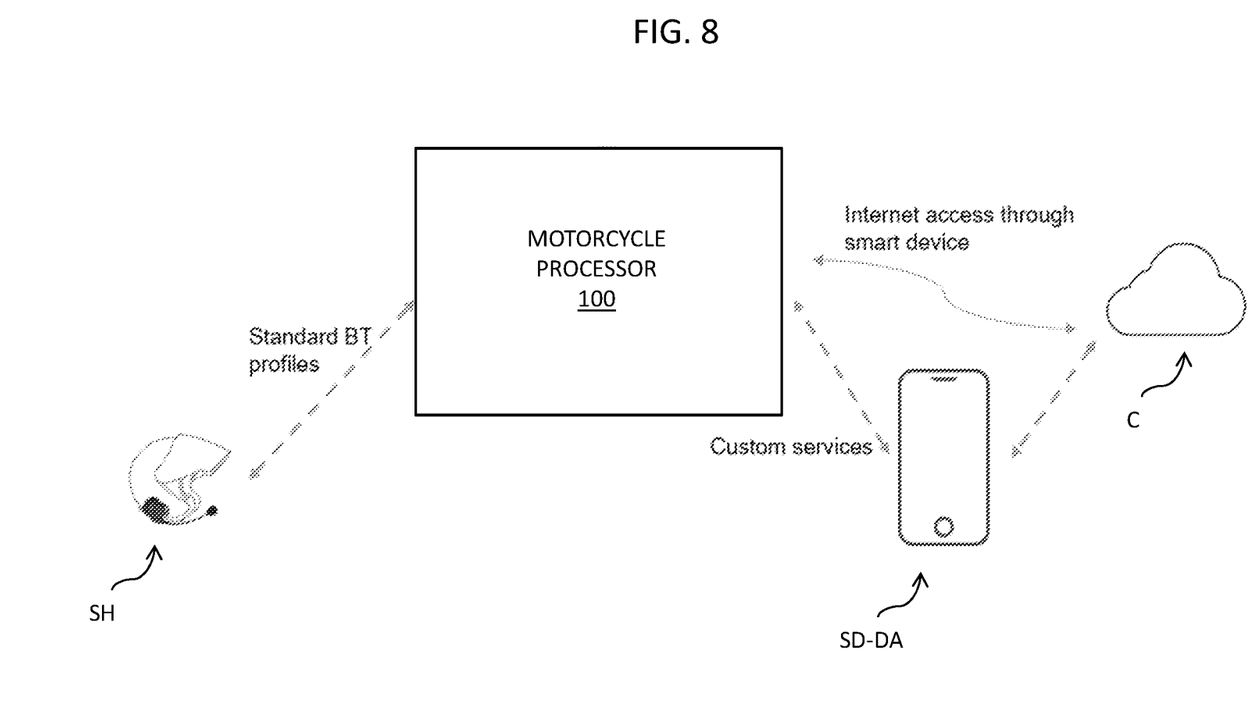

In combination with the above-described embodiments or in alternative to some aspects of the above-described embodiments, FIGS. 6-8 illustrate the motorcycle processor 100 connecting a smart device (e.g., smartphone, smartwatch, etc.) SD in parallel with the helmet SH. In such a case, the smart device SD can provide Internet connection to cloud C if the motorcycle processor 100 is not equipped with a remote-network-enabled system. The motorcycle processor 100 then acts as a bridge between the helmet SH and the smart device SD.

As shown in FIG. 6, with respect to helmet-motorcycle communication, the helmet SH will "see" the motorcycle processor 100 as a standard smart device and leverage the standard communication protocols (BT profiles such as A2DP, HFP, etc.). In order to get a continuous audio stream from the helmet SH, the processor 100 can use the Bluetooth Hands-Free profile (BT HFP) to forward a fake call to the headset that will open a bidirectional audio stream. The audio stream from the motorcycle to the helmet can be used both for standard purposes (audio calls) and for custom purposes (commands, responses, system messages, etc.).

With respect to smart device-motorcycle communication, the smart device SD can provide Internet connection to the motorcycle processor 100. The motorcycle is "seen" as a node in the local network.

As shown in FIG. 7, in case of a custom smart helmet CSH, the communication with the motorcycle processor 100 can be enhanced with a custom communication able to deliver dedicated services (e.g., opening an audio stream only for a command, sending accelerometer measurements, etc.).

As shown in FIG. 8, again with respect to smart device-motorcycle communication, a smart device with dedicated software (e.g., an App) SD-DA can also integrate with the motorcycle to deliver enhanced services. These services can include a better local voice recognition system (the smart device has usually more resources than motorcycle processors), information providing (weather, news, etc.), information gathering (data recording, diagnostics, etc.), firmware updates, etc.

It will be otherwise appreciated that, while advantageous under various respects, voice activity detection (as exemplified in the figures at 302, 304) and/or wake word detection (as exemplified in the figures at 306, 308) may not be mandatory features of the embodiments. This applies irrespective of whether implemented on-board a motorcycle MB (at an instrument cluster, for instance) or implemented in a "smart" helmet SH, SH2.

Similarly, while embodiments as exemplified herein may advantageously implement (on-board a motorcycle MB and/or in a smart helmet SH, SH2), both voice activity detection (302, 304) and wake word detection (306, 308) in order to reduce signal transmission towards the command recognition functions (local and/or network-based), one or more embodiments may provide for even just one of those functions being implemented in order to reduce signal transmission towards the command recognition functions.

As exemplified herein, a dashboard voice control system (for instance, 10) for a motorcycle (for instance, MB) may comprise:

receiver circuitry (for instance, 200RX, 300) configured to receive voice-generated signals (for instance, as provided by MIC, MIC2), command recognition circuitry (for instance, 312, 316; 314, 319) configured to recognize voice-generated command signals for a motorcycle dashboard out of the voice-generated signals received at the receiver circuitry, command implementation circuitry (for instance, 320, 200TX) configured to implement motorcycle dashboard actions (for instance, D, TT) as a function of voice-generated command signals recognized by the command recognition circuitry, wherein the command recognition circuitry comprises:

a (local) command recognition circuit (for instance, 312) located in a first signal propagation path (for instance, 312, 316, 318) towards the command implementation circuitry, the command recognition circuit configured to supply to the command implementation circuitry voice-generated command signals recognized by the command recognition circuit, a network connectivity interface (for instance, 200) located in a second signal propagation path (for instance, 314, 200, 319, 318) towards the command implementation circuitry, the network connectivity interface configured to:

transmit voice-generated signals to a net-based voice-generated command signal recognition facility (for instance, C), receive from the net-based voice-generated command signal recognition facility and supply to the command implementation circuitry voice-generated command signals recognized by the net-based voice-generated command signal recognition facility.

A motorcycle dashboard voice control system as exemplified herein may comprise a network availability node (for instance, 310) configured to check availability of the net-based voice-generated command signal recognition facility and to inhibit transmission of voice-generated signals towards the network connectivity interface as a result of the net-based voice-generated command signal recognition facility being checked (for instance, 310=N) to be unavailable.

A motorcycle dashboard voice control system as exemplified herein may comprise the network availability node configured to inhibit propagation of voice-generated signals towards the command recognition circuit as a result of the net-based voice-generated command signal recognition facility being checked (for instance, 310=Y) to be available.

In a motorcycle dashboard voice control system as exemplified herein (see FIG. 5), the first signal propagation path in the command recognition circuitry may circumvent the network availability node (310), wherein the first signal propagation path (312, 316, 318) is open to (that is, provides or facilitates) propagation of voice-generated signals towards the command recognition circuit irrespective of the availability of the net-based voice-generated command signal recognition facility.

A motorcycle dashboard voice control system as exemplified herein may comprise wake word processing circuitry (for instance, 306, 308) configured to detect the occurrence of at least one wake word in the voice-generated signals received at the receiver circuitry and to inhibit (for instance, at 308) forwarding towards the command recognition circuitry voice-generated signals other than those voice-generated signals where the occurrence of at least one wake word is detected.

A motorcycle dashboard voice control system as exemplified herein may comprise voice activity detection circuitry (for instance, 302, 304) configured to detect the occurrence of voice-generated signals in signals received at the receiver circuitry and to inhibit (for instance, at 304) forwarding towards the command recognition circuitry signals (noise, for instance) received at the receiver circuitry other than signals where the occurrence of voice-generated signals is detected.

A motorcycle dashboard voice control system as exemplified herein may comprise the voice activity detection circuitry arranged upstream of the wake word processing circuitry, wherein the voice activity detection circuitry is configured to inhibit (for instance, at 304) forwarding to the wake word processing circuitry signals received at the receiver circuitry other than signals where the occurrence of voice-generated signals is detected.

In a motorcycle dashboard voice control system as exemplified herein, the receiver circuitry (for instance, 200RX) may be configured to receive voice-generated signals from a plurality of sources (for instance, SH, SH2), optionally with reception of voice-generated signals from one source (SH, respectively SH2) in the plurality of sources being exclusive of reception of voice-generated signals from another source (SH2, respectively SH) in the plurality of sources.

A dashboard voice control system as exemplified herein may be used to equip (possibly by way of retrofitting) a motorcycle (for instance, MB) as exemplified herein.

A motorcyclist helmet (for instance, SH, SH2) as exemplified herein may comprise (see all of FIGS. 2 to 6, for instance):

a microphone (for instance, MIC) sensitive to vocal activity at the helmet, the microphone producing voice-generated signals as a function of the vocal activity, a transmitter circuit (for instance, 200A) configured to transmit the voice-generated signals towards the receiver circuitry (for instance, 200RX) in a dashboard voice control system as exemplified herein.

A motorcyclist helmet as exemplified herein (see FIG. 3, for instance) may comprise voice activity detection circuitry (for instance 302, 304) configured to detect the occurrence of voice-generated signals produced by the microphone as a function of the vocal activity and to inhibit transmission from the transmitter circuit in the absence of voice-generated signals produced by the microphone detected by the voice activity detection circuitry.

A motorcyclist helmet as exemplified herein (see FIG. 4, for instance) may comprise wake word processing circuitry (for instance, 306, 308) configured to detect the occurrence of at least one wake word in the voice-generated signals produced by the microphone and to inhibit transmission from the transmitter circuit of voice-generated signals produced by the microphone other than those voice-generated signals produced by the microphone where the occurrence of at least one wake word is detected.

In a motorcyclist helmet as exemplified herein (see again FIG. 4, for instance) the voice activity detection circuitry may be arranged upstream of the wake word processing circuitry, wherein the voice activity detection circuitry is configured to inhibit forwarding signals to the wake word processing circuitry in the absence of voice-generated signals produced by the microphone detected by the voice activity detection circuitry.

A method of controlling a motorcycle dashboard as exemplified herein may comprise:

receiving (at the motorcycle) voice-generated signals comprising voice-generated command signals for the motorcycle dashboard, recognizing voice-generated command signals for the motorcycle dashboard out of the voice-generated signals received, providing command implementation circuitry to implement motorcycle dashboard actions as a function of voice-generated command signals recognized by the command recognition circuitry, wherein the recognizing voice-generated command signals may comprise:

providing a command recognition circuit located in a first signal propagation path towards the command implementation circuitry, the command recognition circuit configured to supply to the command implementation circuitry voice-generated command signals recognized by the command recognition circuit, providing a network connectivity interface located in a second signal propagation path towards the command implementation circuitry, and activating the network connectivity interface to:

transmit voice-generated signals to a net-based voice-generated command signal recognition facility, receive from the net-based voice-generated command signal recognition facility and supply to the command implementation circuitry voice-generated command signals recognized by the net-based voice-generated command signal recognition facility.

A method as exemplified herein (see FIG. 5, for instance) may comprise:

activating both the first signal propagation path and the second signal propagation path towards the command implementation circuitry, wherein voice-generated command signals are recognized:
- at only one of the first signal propagation path and the second signal propagation path (due, for instance, to net/Cloud resource unavailability or to an inability of the local recognizer to recognize certain voice-generated commands), or
- at a faster one (the local recognizer 312 for instance) of the first signal propagation path and the second signal propagation path earlier than at a slower one (the Cloud-based recognizer C, for instance) of the first signal propagation path and the second signal propagation path, and implementing motorcycle dashboard actions as a function of voice-generated command signals recognized by the only one or the faster one of the first signal propagation path and the second signal propagation path.

The details and embodiments may vary with respect to what has been disclosed herein merely by way of example without departing from the extent of protection.

The extent of protection is determined by the annexed claims.

What is claimed is:

1. A motorcycle dashboard voice control system comprising:
   receiver circuitry configured to receive voice-generated signals;
   wake word processing circuitry configured to detect an occurrence of at least one wake word in the voice-generated signals received at the receiver circuitry;
   command recognition circuitry configured to recognize voice-generated command signals for a motorcycle dashboard out of the voice-generated signals received at the receiver circuitry;
   command implementation circuitry configured to implement motorcycle dashboard actions as a function of voice-generated command signals recognized by the command recognition circuitry,
   wherein the command recognition circuitry comprises:
      a command recognition circuit located in a first signal propagation path towards the command implementation circuitry, the command recognition circuit configured to supply, to the command implementation circuitry, voice-generated command signals recognized by the command recognition circuitry; and
      a network connectivity interface located in a second signal propagation path towards the command implementation circuitry, the network connectivity interface configured to:
         transmit the voice-generated signals to a net-based voice-generated command signal recognition facility;
         receive, from the net-based voice-generated command signal recognition facility, the voice-generated command signals recognized by the net-based voice-generated command signal recognition facility; and
         supply, to the command implementation circuitry, the voice-generated command signals; and
   a network availability node configured to, in response to detecting the occurrence of the at least one wake word by the wake word processing circuitry, check availability of the net-based voice-generated command signal recognition facility.

2. The motorcycle dashboard voice control system of claim 1, wherein the network availability node is further configured to inhibit transmission of the voice-generated signals towards the network connectivity interface in response to determining that the net-based voice-generated command signal recognition facility is checked to be unavailable.

3. The motorcycle dashboard voice control system of claim 2, wherein the first signal propagation path in the command recognition circuitry circumvents the network availability node, and wherein the first signal propagation path is open to propagation of the voice-generated signals towards the command recognition circuit irrespective of the availability of the net-based voice-generated command signal recognition facility.

4. The motorcycle dashboard voice control system of claim 1, further comprising the network availability node configured to inhibit propagation of the voice-generated signals towards the command recognition circuit in response to determining that of the net-based voice-generated command signal recognition facility is checked to be available.

5. The motorcycle dashboard voice control system of claim 1, wherein the wake word processing circuitry is further configured to
   inhibit forwarding, towards the command recognition circuitry, other voice-generated signals other than the voice-generated signals where the occurrence of the at least one wake word is detected.

6. The motorcycle dashboard voice control system of claim 5, further comprising voice activity detection circuitry configured to:
   detect an occurrence of the voice-generated signals in signals received at the receiver circuitry; and
   inhibit forwarding, towards the command recognition circuitry, signals received at the receiver circuitry other than signals where the occurrence of the voice-generated signals is detected.

7. The motorcycle dashboard voice control system of claim 6, wherein the voice activity detection circuitry is arranged upstream of the wake word processing circuitry, and wherein the voice activity detection circuitry is configured to inhibit forwarding, to the wake word processing circuitry, signals received at the receiver circuitry other than signals where the occurrence of the voice-generated signals is detected.

8. The motorcycle dashboard voice control system of claim 1, wherein the receiver circuitry is configured to receive the voice-generated signals from a plurality of sources.

9. The motorcycle dashboard voice control system of claim 8, wherein the receiver circuitry is configured to receive the voice-generated signals from one source in the plurality of sources exclusive of reception of other voice-generated signals from another source in the plurality of sources.

10. A method of controlling a motorcycle dashboard, the method comprising:
   receiving, by receiver circuitry, voice-generated signals comprising voice-generated command signals for the motorcycle dashboard;
   recognizing, by command recognition circuitry, voice-generated command signals for the motorcycle dashboard out of the received voice-generated signals; and
   implementing, by command implementation circuitry, motorcycle dashboard actions as a function of the voice-generated command signals recognized by the command recognition circuitry;
   the recognizing the voice-generated command signals comprising:

checking availability of a net-based voice-generated command signal recognition facility;

in response to determining that the net-based voice-generated command signal recognition facility being checked to be unavailable, supplying, by a command recognition circuit located in a first signal propagation path towards the command implementation circuitry, to the command implementation circuitry, the voice-generated command signals recognized by the command recognition circuit;

in response to determining that the net-based voice-generated command signal recognition facility being checked to be available, transmitting, by a network connectivity interface located in a second signal propagation path towards the command implementation circuitry, the voice-generated signals to the net-based voice-generated command signal recognition facility;

after transmitting, receiving, by the network connectivity interface, voice-generated command signals recognized by the net-based voice-generated command signal recognition facility from the net-based voice-generated command signal recognition facility; and supplying, by the network connectivity interface, to the command implementation circuitry, the voice-generated command signals recognized by the net-based voice-generated command signal recognition facility.

11. The method of claim 10, comprising:
activating both the first signal propagation path and the second signal propagation path towards the command implementation circuitry; and
implementing the motorcycle dashboard actions as a function of the recognized voice-generated command signals.

12. The method of claim 11, wherein the voice-generated command signals are recognized at only one of the first signal propagation path and the second signal propagation path.

13. The method of claim 11, wherein the voice-generated command signals are recognized at a faster one of the first signal propagation path and the second signal propagation path earlier than at a slower one of the first signal propagation path and the second signal propagation path.

14. The method of claim 10, comprising
inhibiting transmission of the voice-generated signals towards the network connectivity interface as a result of the net-based voice-generated command signal recognition facility being checked to be unavailable.

15. The method of claim 10, comprising
inhibiting propagation of the voice-generated signals towards the command recognition circuit as a result of the net-based voice-generated command signal recognition facility being checked to be available.

16. The method of claim 10, comprising:
detecting, by wake word processing circuitry, an occurrence of at least one wake word in the received voice-generated signals; and
inhibiting, by the wake word processing circuitry, forwarding, towards the command recognition circuitry, other voice-generated signals other than the voice-generated signals where the occurrence of the at least one wake word is detected.

17. The method of claim 16, comprising:
detecting, by voice activity detection circuitry, an occurrence of the received voice-generated signals in signals received by receiver circuitry; and
inhibiting, by the voice activity detection circuitry, forwarding, towards the command recognition circuitry, signals received at the receiver circuitry other than signals where the occurrence of the voice-generated signals is detected.

18. A motorcycle voice control system comprising:
a microphone sensitive to vocal activity disposed in a helmet, the microphone configured to produce voice-generated signals as a function of the vocal activity;
wake word processing circuitry configured to detect an occurrence of at least one wake word in the voice-generated signals;
command recognition circuitry configured to recognize voice-generated command signals out of the voice-generated signals;
command implementation circuitry configured to implement motorcycle dashboard actions as a function of voice-generated command signals recognized by the command recognition circuitry,
wherein the command recognition circuitry comprises:
a command recognition circuit located in a first signal propagation path towards the command implementation circuitry, the command recognition circuit configured to supply, to the command implementation circuitry, voice-generated command signals recognized by the command recognition circuitry; and
a network connectivity interface located in a second signal propagation path towards the command implementation circuitry, the network connectivity interface configured to:
transmit the voice-generated signals to a net-based voice-generated command signal recognition facility;
receive, from the net-based voice-generated command signal recognition facility, the voice-generated command signals recognized by the net-based voice-generated command signal recognition facility; and
supply, to the command implementation circuitry, the voice-generated command signals; and
a network availability node configured to, in response to detecting the occurrence of the at least one wake word by the wake word processing circuitry, check availability of the net-based voice-generated command signal recognition facility.

19. The motorcycle voice control system of claim 18, wherein the wake word processing circuitry is further configured to inhibit forwarding, towards the command recognition circuitry, other voice-generated signals other than the voice-generated signals where the occurrence of the at least one wake word is detected.

20. The motorcycle voice control system of claim 18, further comprising voice activity detection circuitry coupled in a signal path between the command recognition circuitry and the microphone, the voice activity detection circuitry configured to:
detect an occurrence of the voice-generated signals in signals; and
inhibit forwarding, towards the command recognition circuitry, signals other than signals where the occurrence of the voice-generated signals is detected.

* * * * *